United States Patent Office 3,102,873
Patented Sept. 3, 1963

3,102,873
RESINOUS REACTION PRODUCT OF (1) A POLYGLYCIDYL ETHER, (2) A BORON ESTER AND (3) A TERTIARY AMINE
Max M. Lee, Fort Wayne, Ind., assignor to General Electric Company, a corporation of New York
No Drawing. Filed Oct. 28, 1959, Ser. No. 849,153
5 Claims. (Cl. 260—47)

This invention relates to new and useful resin compositions. More particularly, the invention relates to resin compositions having desirable physical, chemical and electrical properties at elevated temperatures, such compositions being further characterized by a long pot life and moderate curing cycle.

Epoxy, epoxide or ethoxyline resins, as they are variously called, are well known in the art. Generally, such epoxy resins comprise a polyether derivative of a polyhydric organic compound, said derivative containing 1, 2 epoxy groups, said compound being selected from the class consisting of polyhydric alcohols and phenols containing at least two phenolic hydroxy groups. For example, U.S. Patent 2,324,483 to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasic acid or acid anhydride, such as phthalic anhydride. The use of organic nitrogen base or amine type materials to cure epoxy resins is also well known as set forth, for example, in Patent 2,444,333, such materials often giving a rapid cure at room temperature. Generally, however, the pot life of amine cured epoxy resins is comparatively short and their high temperature characteristics are often poor.

The relatively short pot life of amine cured epoxy resins is a definite drawback to their use unless the amine curing agent can be added to the epoxy resin just prior to use. A known method of extending the pot life of such resins is to form a complex of the amine curing agent with an organic acid. This is generally not satisfactory since it introduces undesirable properties into the cured resin and the lengthening of the pot life is only moderate.

A principal object of this invention is to provide new epoxy resin compositions which have desirable physical, chemical and electrical characteristics, including long pot life and stability and resistance to elevated temperatures of the order of 150° C. which make them particularly desirable as electrical insulating materials.

Briefly, the invention comprises epoxy resin compositions having as a curing agent a tertiary amine in combination with boron compounds such as boron esters, more specifically, alkyl boron esters.

Those parts of my invention which are considered to be new are set forth in detail in the claims appended hereto. The invention, however, may be better understood and further objects and advantages thereof appreciated from a consideration of the following description.

The amine curing agents used in connection with my invention are tertiary amines typified by the amino phenols characterized by dimethylaminomethyl phenol, tris (dimethylaminomethyl) phenol and similar tri-substituted amino phenol, compositions, benzyldimethylamine, tributylamine, triethylamine, trimethylamine, dimethylaminopiperazine, etc., which are well known in the art. The boron compounds used in connection with the invention are alkyl boron esters or alkyl borates, such as trimethyl borate, triethyl borate, tributyl borate, trioctyl borate, etc., and most preferably, lower alkyl borates including those mentioned. The concentration of boron compound to amine may be varied to a considerable degree. However, I have found that equivalent molar quantities of the boron ester and tertiary amine appear to be most effective in prolonging pot life and facilitating the curing of the combination.

The ethoxyline resins used in conjunction with my invention are, as pointed out above, well known in the art. They are described in Castan United States Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxyphenyl)-2,2-propane. United States Patent Nos. 2,494,295, 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

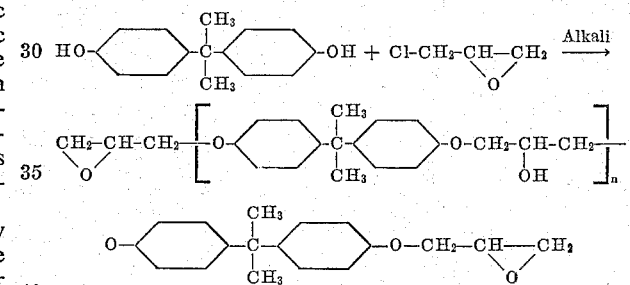

where $n$ has an average value ranging from 0 to about 7. Such ethoxyline resins are sold under the name of Epon by Shell Chemical Corporation, under the name Araldite by the Ciba Company, as Epi-Rez resins by Devoe-Raynolds Company and ERL resins by the Bakelite Company. The data given below for such resin is representative.

TABLE I

| Epoxy resin | Epoxide equivalent | M.P., 0° |
|---|---|---|
| Epon 828 | 192 | 9 |
| Epon 834 | 225-290 | 20-28 |
| Epon 1001 | 450-525 | 64-76 |
| Epon 1004 | 905-985 | 97-103 |
| Epon 1007 | 1,600-1,900 | 127-133 |
| Epon 1009 | 2,400-4,000 | 145-155 |
| Epon 1062 | 140-165 | Liquid |
| Epon 1064 | 300-375 | 40-45 |
| Araldite 6010 | 192 | Liquid |
| Araldite 6020 | 200-205 | Liquid |
| ERL 2774 | 175-200 | Liquid |
| Epi-Rez 510 | 175-200 | Liquid |

One of the advantages of the present invention is that it provides a practical way of retarding the gelation of an epoxy resin after an amine catalyst is added and prolonging its pot life when it becomes necessary, for some reason such as a failure of equipment, to stop an amine catalyzed epoxy resin from gelling. In accordance with the invention, a boron ester, mol equivalent to the amine present, is added to prolong the pot life.

It will be appreciated that according to the present invention the tertiary amine and boron ester can be first combined and then added to the epoxy resin or alternatively the tertiary amine compound can be added first to the epoxy resin and the boron ester material can be added when required. It will be realized, of course, that the boron ester can also be added to an epoxy resin-amine composition but such course is not recommended since the amine and epoxy resin generally react very quickly in the absence of the boron compound.

The following examples are given to illustrate the various advantages of the present invention and are not to be taken as limiting in any way. All parts are by weight.

*Example 1*

To 100 parts of Epon 828 there was added 1 part of dimethylaminomethyl phenol and 1 part tributyl borate. This composition became fully cured within one hour at 180° C. However, after standing for four weeks in the uncured state at room temperature, its viscosity had changed very little. In the absence of the tributyl borate and using only dimethylaminomethyl phenol in the above amount, the composition became extremely viscous within three weeks and when heated at 180° C. had not cured within one hour.

*Example 2*

To 100 parts Epon 828 there was added 5 parts tributyl borate and 1 part of dimethylaminomethyl phenol which composition when heated at 180° C. cured to a hard resinous state within one hour. When the tributyl borate was omitted, no gelation or cure was observed after four hours at 180° C. When the same composition was heated for four hours at 135° C., a completely cured, clear, hard and tough resin was obtained. Only a slight change in viscosity was observed on standing for four months at room temperature. The cured resins appear to have outstanding hydrolytic stability in the presence of boiling water.

There are set forth in Table II below further examples using various proportions of benzyldimethylamine (BDMA) alone and in combination with various proportions of tributyl borate (TBB).

TABLE II

| Example | Composition | Gel time at room temp. (hours) | Gel time at 125° C. (min.) | Condition of cure at 5 hours @ 125° C. |
| --- | --- | --- | --- | --- |
| 3 | 100 parts Epon 828<br>4.0 parts BMDA | Ca. 6 | 21 | Hard, tough. |
| 4 | 100 parts Epon 828<br>4.0 parts BMDA<br>1.4 parts TBB | Ca. 20 | 40 | Same as 3. |
| 5 | 100 parts Epon 828<br>4.0 parts BMDA<br>2.8 parts TBB | Ca. 30 | 57 | Hard; slightly more brittle than 3. |
| 6 | 100 parts Epon 828<br>4.0 parts BMDA<br>4.1 parts TBB | Ca. 50 | 90 | Hard; slightly more brittle than 5. |
| 7 | 100 parts Epon 828<br>4.0 parts BMDA<br>6.8 parts TBB | Still fluid at 300. | 150 | Hard; slightly brittle. |

From the above table, it will be quite apparent that tributyl borate is a very effective polymerization retarder when used in connection with tertiary amine curing agents which normally gel and cure very rapidly. At the same time, with the present compositions there are obtained well cured resins at elevated temperatures. It will be noted that as little as about one part of the boron ester per about four parts of tertiary amine produces salutary results.

*Example 8*

There was prepared a composition consisting of, by weight, 100 parts Epon 828, 6.16 parts tributyl borate and 2.3 parts tris(dimethylaminomethyl) phenol. The gel and cure times of the above composition at various temperatures were determined using samples ¼ inch thick, the cure times being noted as those times at a given temperature for the sample to reach a maximum Shore D hardness measured at the particular temperature. For example, at 200° C. the gel time was about four minutes, whereas at 85° C. the gel time was about nine minutes. The cure time at 200° C. was about forty-eight minutes while the cure time at 90° C. was about eleven hours.

The moisture resistance of the composition of Example 8 was determined by measuring the insulation resistance after prolonged immersion in boiling water between conductors cast in a block of the resinous material. The resin samples used were ⅝ inch in diameter and ⅜ inch thick. The conductors were 0.09, three inches in diameter and placed 5/16 inches apart, the samples being cured at 125° C. for about 12 hours. The insulation resistance when measured using a G-E insulation resistance meter was found to be greater than 20,000 megohms. After seven days immersion in boiling water, the samples were quickly and thoroughly dried by an air hose and gave an immediate resistance measurement of 1,400 megohms.

Capacitors were formed by separating two aluminum foils by an 0.007 inch thick film of the above resin, again cured for 12 hours at 125° C. The capacitance of the capacitors so made was 1010 mmfd. at 25° C. and 1050 mmfd. at 125° C. The respective dissipation factors were 0.3% and 2.2%.

The adhesive strength of the above material is also very desirable, as is the weight loss on heat aging. The weight loss was measured on sample discs 2¾ inches in diameter by ¼ inch in thickness at aging temperatures of 150° C., 180° C. and 210° C., all samples having been cured for about 16 hours at 125° C. The results of such aging tests are shown in Table III below:

TABLE III

| Temperature | Percent weight loss on heat aging | | | | | |
| --- | --- | --- | --- | --- | --- | --- |
| | 1 day | 2 days | 4 days | 8 days | 16 days | 32 days |
| 150° C. | (¹) | (¹) | (¹) | (¹) | (¹) | .025 |
| 180° C. | .078 | .10 | .113 | .270 | .467 | .768 |
| 210° C. | .285 | .453 | .696 | 1.027 | 1.59 | 2.640 |

¹ No change.

There are provided by this invention improved epoxy resin compositions containing tertiary amine curing agents, the pot lives of which are very favorably increased by the addition thereto of boron ester materials. At the same time, the materials have a moderate curing cycle. The products obtained by the practice of the invention are characterized by excellent clarity, good adhesion, good moisture resistance, improved electrical properties and excellent thermal stability at elevated temperatures. The compositions of the invention may be used as such or in combination with fillers well known to those skilled in the art for such applications as potting electrical or other components as casting compounds, as binders or impregnates for laminated materials, as adhesives among many other uses.

What I claim as new and desire to secure by Letters Patent of the United States is:

1. A composition of matter comprising the heat reaction product of (1) a complex epoxy resin containing epoxide groups and comprising the polyether derivative of a polyhydric compound selected from the class consisting of polyhydric alcohols having adjacent hydroxyl groups and phenols having at least two phenolic hydroxyl groups, (2) dimethylaminomethyl phenol, and (3) tributyl borate.

2. A composition of matter comprising the heat reaction product of, by weight, (1) 100 parts of a complex epoxy resin containing epoxide groups and comprising the polyether derivative of a polyhydric organic compound selected from the class consisting of polyhydric alcohols having adjacent hydroxyl groups and phenols having at least two phenolic hydroxyl groups, (2) about one part of dimethylaminomethyl phenol and (3) about one part tributyl borate.

3. A composition of matter comprising the heat reaction product of (1) a complex epoxy resin containing epoxide groups and comprising the polyether derivative of a polyhydric compound selected from the class consisting of polyhydric alcohols having adjacent hydroxyl groups and phenols having at least two phenolic hydroxyl groups, (2) tris(dimethylaminomethyl) phenol, and (3) trubutyl borate.

4. A composition of matter comprising the reaction product of 100 parts by weight of (1) a complex epoxy resin comprised of the reaction product of epichlorohydrin and bis-(4-hydroxy phenyl)-2,2-propane, from 1 to 4 parts of (2) benzyl dimethylamine and from 1 to 7 parts of (3) tributyl borate.

5. A composition of matter comprising the reaction product of 100 parts by weight of (1) a complex epoxy resin comprised of the reaction product of epichlorohydrin and bis(4-hydroxy phenyl)-2,2-propane, from 1 to 4 parts of (2) dimethylaminomethyl phenol and from 1 to 7 parts of (3) tributyl borate.

References Cited in the file of this patent
UNITED STATES PATENTS

| | | |
|---|---|---|
| 2,809,184 | Langer | Oct. 8, 1957 |
| 2,941,981 | Elbling et al. | June 27, 1960 |
| 2,949,441 | Newey | Aug. 16, 1960 |